US008041343B2

(12) United States Patent
McLean

(10) Patent No.: US 8,041,343 B2
(45) Date of Patent: Oct. 18, 2011

(54) APPARATUS AND METHODS FOR INCENTIVIZED SUPERDISTRIBUTION OF CONTENT

(75) Inventor: Ivan Hugh McLean, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1445 days.

(21) Appl. No.: 11/361,224

(22) Filed: Feb. 23, 2006

(65) Prior Publication Data

US 2007/0207780 A1 Sep. 6, 2007

(51) Int. Cl.
*H04M 3/42* (2006.01)

(52) U.S. Cl. .................... 455/414.1; 455/414.2

(58) Field of Classification Search ............... 455/414.1, 455/414.2, 466, 41.2, 412.1, 414.3, 418–420; 705/26, 59, 52, 51, 14.11, 14.13, 14.16, 35
See application file for complete search history.

(56) References Cited

U.S. PATENT DOCUMENTS

| 5,537,314 | A * | 7/1996 | Kanter .................. 705/14.13 |
| 6,029,141 | A | 2/2000 | Bezos et al. ................. 705/27 |
| 6,446,044 | B1 * | 9/2002 | Luth et al. .................. 705/14.16 |
| 7,249,107 | B2 * | 7/2007 | Yaacovi ..................... 705/59 |
| 7,370,017 | B1 * | 5/2008 | Lindeman et al. ............. 705/59 |
| 7,421,411 | B2 * | 9/2008 | Kontio et al. ................. 705/52 |
| 7,792,517 | B2 * | 9/2010 | Mowry et al. ................ 455/410 |
| 2001/0037283 | A1 * | 11/2001 | Mullaney ..................... 705/37 |
| 2003/0204723 | A1 * | 10/2003 | Narin et al. ................... 713/165 |
| 2004/0254831 | A1 * | 12/2004 | Dean ........................... 705/14 |
| 2005/0075093 | A1 * | 4/2005 | Lei et al. ...................... 455/412.1 |
| 2006/0229936 | A1 * | 10/2006 | Cahill .......................... 705/14 |
| 2007/0005775 | A1 * | 1/2007 | Philips ......................... 709/227 |
| 2007/0179898 | A1 * | 8/2007 | Medvinsky et al. .......... 705/59 |
| 2007/0185766 | A1 * | 8/2007 | Barel et al. ................... 705/14 |

FOREIGN PATENT DOCUMENTS

| JP | 64003745 | 1/1989 |
| JP | 11259964 | 9/1999 |
| JP | 2002109379 | 4/2002 |
| JP | 2002318873 | 10/2002 |
| JP | 2003296623 | 10/2003 |
| JP | 2004265333 | 9/2004 |
| JP | 2004355657 | 12/2004 |
| JP | 20054277 | 1/2005 |
| JP | 2005515560 | 5/2005 |
| JP | 2005202591 | 7/2005 |
| JP | 200618755 | 1/2006 |
| WO | WO0101307 | 1/2001 |
| WO | WO0101320 | 1/2001 |
| WO | WO0111472 | 2/2001 |

OTHER PUBLICATIONS

International Search Report and Written Opinion—PCT/US2007/062629, International Search Authority—European Patent Office—Jun. 26, 2007.

* cited by examiner

*Primary Examiner* — Brandon J Miller
(74) *Attorney, Agent, or Firm* — Fariba Yadegar-Bandari

(57) ABSTRACT

Apparatus and methods for providing an incentive-based system for the superdistribution of content, which include one or more communications devices transmitting one or more referral messages relating to the content. Further, the apparatus and methods include the communications devices ordering content from across the network based on the referral messages, where a reward is generated for one or more referring devices based on the one or more referral messages. Additionally, the application of privacy and authentication mechanisms protects the privacy and verifies the identities of the parties involved in the transaction.

39 Claims, 5 Drawing Sheets

APPARATUS AND METHODS FOR INCENTIVIZED SUPERDISTRIBUTION OF CONTENT

FIELD OF THE INVENTION

The described embodiments generally relate to the management of content distribution to communications devices operating on a network. More particularly, the described embodiments relate to apparatus and methods of managing and incentivizing the distribution of licensed content among wireless devices on a wireless network.

BACKGROUND

The sharing of digital content among computer devices is fairly common. The user of a computer device has an incentive to share their content in order to gain access to additional content provided by the users of other computer devices. This incentive is particularly strong when the cost to the user of sharing the content is low or negligible. Additionally, such sharing of digital content provides the producer of the content with an additional marketing and/or advertising channel.

In some environments, however, there are disincentives to sharing content. For example, licensed content may include usage rules that restrict or prevent the sharing of the content. Such licensed content includes content subject to digital rights management ("DRM"), for example, including certain audio and video content. Because of these usage rule restrictions, the user of a computer device having this content may not have any incentive to share their content. As such, the additional marketing and/or advertising channel provided by content sharing is lost.

Further for example, a user of a wireless device in a wireless network may incur additional disadvantages. For example, the cost of making a data call on a wireless device over a wireless network is relatively high when compared to the cost of a similar data exchange by a desktop computer connected to the Internet. Additionally, the data throughput during a data call by wireless device over a wireless network may be substantially less when compared to the data throughput of a similar data exchange by desk top computer connected to the Internet, and thus the data call may be relatively slow. Further, for example, a wireless device typically has significantly less memory when compared to other computer devices, such as a desktop computer, thereby limiting the ability of the wireless device to store data comprising the content. Thus, these relatively high costs, relatively low speeds, and relatively limited storage capacities may be a disincentive to the user of the wireless device to share content over a wireless network.

Therefore, there is a need it to provide improved apparatus and methods for sharing licensed content among computer devices.

SUMMARY

To address one or more of the drawbacks of the prior art, the disclosed embodiments provide apparatus and methods for managing and incentivizing the distribution of licensed content among wireless devices on a wireless network In one embodiment, a method of content distribution comprises generating a first referral message including a first referral identification, a content identification and a content link. The first referral identification comprises a unique first device identifier associated with a first communications device generating the first referral message. The content identification comprises a unique content identifier associated with a digital content having a license. The content link comprises a reference to a source operable to transmit at least one of the digital content and the license to the digital content across a wireless network. The method further includes transmitting the first referral message to a second communications device, and receiving a first reward based on the first referral message.

In another embodiment, a computer-readable medium embodying logic for content distribution comprises at least one sequence of instructions, wherein execution of the instructions by a processor causes the processor to perform the acts described in the preceding paragraph.

In yet another embodiment, a communications device comprises a means for generating a first referral message including a first referral identification, a content identification and at least a portion of a content link. The first referral identification comprises a unique first device identifier associated with a first communications device generating the first referral message. The content identification comprises a unique content identifier associated with a digital content having a license. The content link comprises a reference to a source operable to transmit at least one of the digital content and the license to the digital content across a wireless network. The device further comprises a means for transmitting the first referral message to a second communications device, and a means for receiving a first reward based on the first referral message.

In still another embodiment, a communications device comprises a computer platform having a memory comprising a digital content having a license, a content link comprising a reference to a source operable to transmit at least one of the digital content and the license to the digital content across a wireless network, a unique content identifier associated with the digital content, and a first unique device identifier. The device further comprises a content manager module having referral logic operable to generate and transmit a first referral message. The first referral message comprises a first referral identification, the content identification and the content link. Further, the first referral identification corresponds to the first unique device identifier. Additionally, the first referral message is operable to cause a reward to be associated with the first referral identification when a purchase of the digital content or the license to the digital content is made based on the first referral message.

In another embodiment, a method of distributing content comprises receiving a first referral message comprising a first referral identification, a content identification and a content link. The first referral identification comprises a unique first device identifier associated with a first communications device. The content identification comprises a unique content identifier associated with a digital content having a license. The content link comprises a reference to a source operable to transmit at least one of the digital content and the license to the digital content across a wireless network. The method further comprises generating an order message comprising purchasing information, the first referral identification and the content identification. Also, the method comprises transmitting the order message across a network according to the content link, and receiving from across the network at least one of the digital content and the license to the digital content based on the order message.

In another embodiment, a computer-readable medium embodying logic for content distribution comprises at least one sequence of instructions, wherein execution of the instructions by a processor causes the processor to perform the acts described in the preceding paragraph.

In a further embodiment, a communications device comprises a means for receiving a first referral message comprising a first referral identification, a content identification and a content link. The first referral identification comprises a unique first device identifier associated with a first communications device. The content identification comprises a unique content identifier associated with a digital content having a license. The content link comprises a reference to a source operable to transmit at least one of the digital content and the license to the digital content across a wireless network. The device further comprises a means for generating an order message comprising purchasing information, the first referral identification and the content identification, and a means for transmitting the order message across a network according to the content link. Additionally, the device comprises a means for receiving from across the network at least one of the digital content and the license to the digital content based on the order message.

In yet another embodiment, a method of content distribution comprises receiving an order message for purchasing at least one of a digital content and a license to the digital content. The order message comprises delivery information, a first referral identification and a content identification. The delivery information comprises a destination on a network for receiving a transmission of the digital content and the license. The first referral identification comprises a unique first device identifier associated with a first communications device. The content identification comprises a unique content identifier associated with at least one of the digital content and the license to the digital content. The method further comprises determining a reward based on the order message, and associating the reward with an entity based on the order message.

In another embodiment, a computer-readable medium embodying logic for content distribution comprises at least one sequence of instructions, wherein execution of the instructions by a processor causes the processor to perform the acts described in the preceding paragraph.

In still another embodiment, an apparatus for distributing content comprises a means for receiving an order message for purchasing at least one of a digital content and a license to the digital content. The order message comprises delivery information, a first referral identification and a content identification. The delivery information comprises a destination on a network for receiving a transmission of the digital content and the license. The first referral identification comprises a unique first device identifier associated with a first communications device. The content identification comprises a unique content identifier associated with at least one of the digital content and the license to the digital content. The apparatus further comprises a means for determining a reward based on the order message, and a means for associating the reward with an entity based on the order message.

In yet another embodiment, an apparatus for distributing content comprises a communications module operable to receive an order message for purchasing at least one of a digital content and a license to the digital content from across a network. The order message comprises purchasing information, delivery information, a first referral identification and a content identification. The purchasing information comprises payment information associated with a source of funds to purchase the digital content or the license to the content. The delivery information comprises a destination on the network for receiving a transmission of the digital content and the license. The first referral identification comprises a unique first device identifier associated with a first communications device. The content identification comprises a unique content identifier associated with at least one of the digital content and the license to the digital content. Further, the apparatus comprises a reward module operable to determine a reward based on the order message and the first referral identification.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The described embodiments include apparatus, methods and computer readable media that provide for an incentive-based system of peer-to-peer distribution of content, such as licensed content, over a network.

Figure 1:
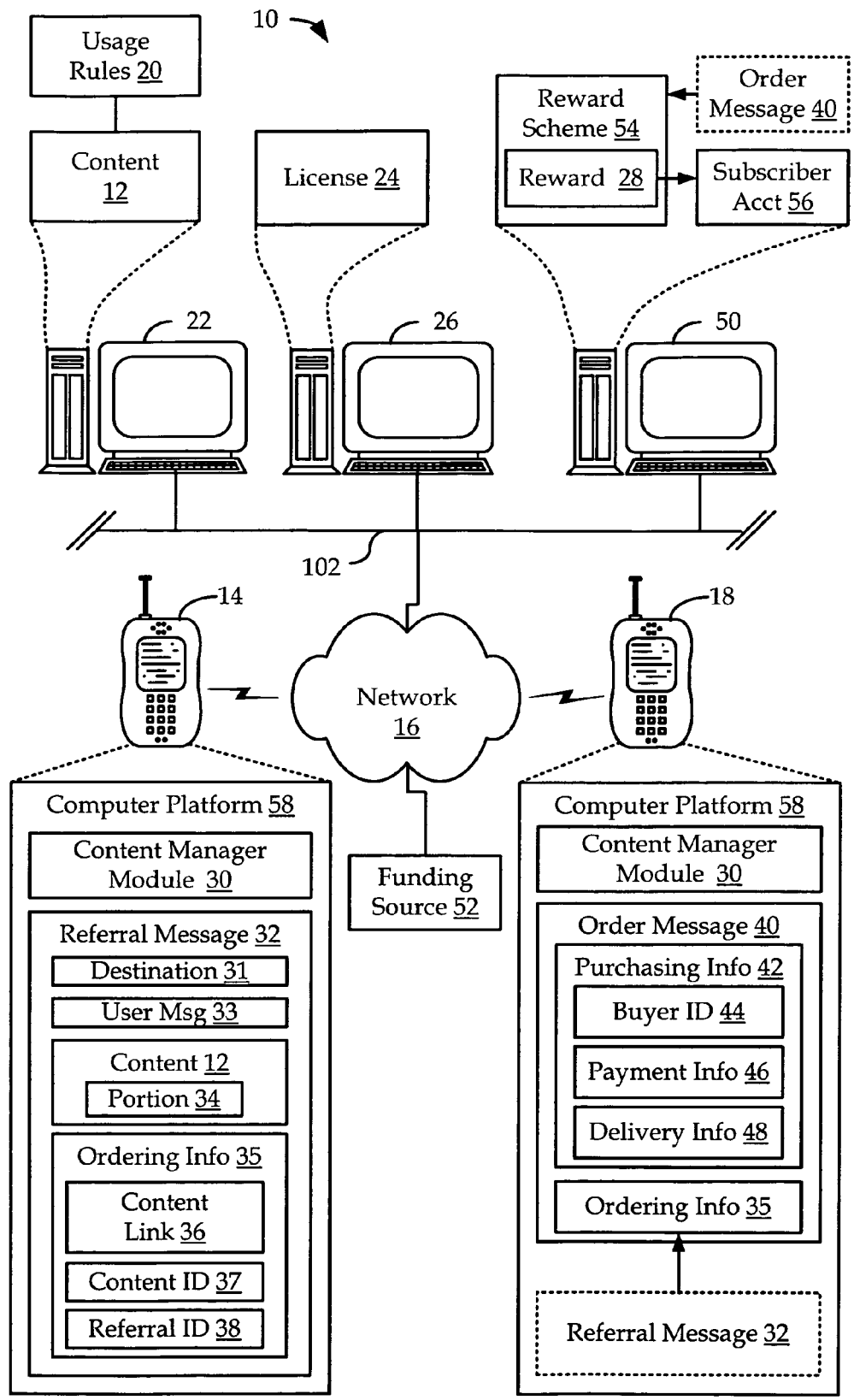
FIG. 1 is a schematic diagram of one embodiment of a system for incentivized superdistribution of content across a network.
Figure 2:
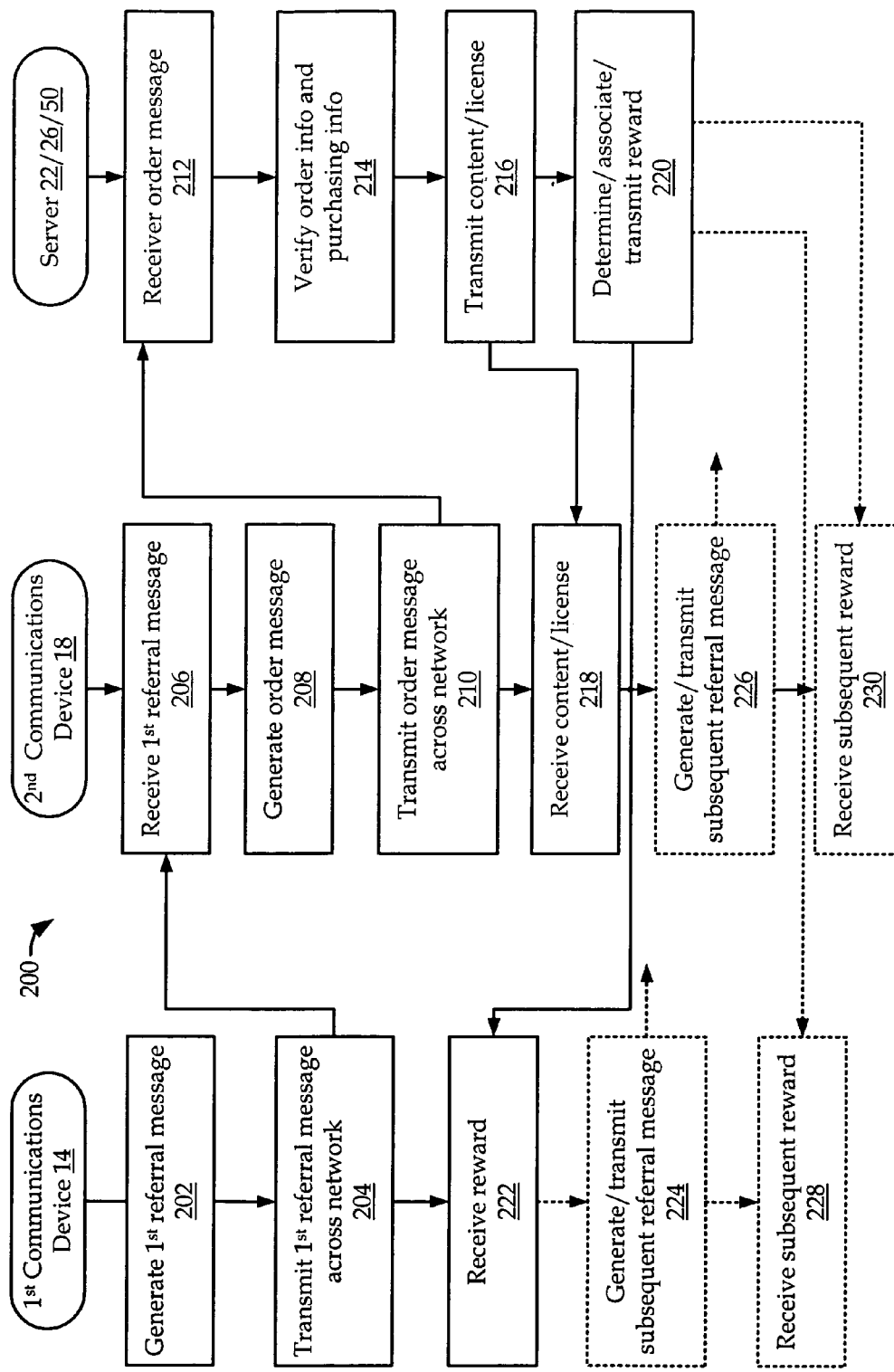
FIG. 2 is a flowchart of one embodiment of a method of operation of the system of FIG. 1.

Referring to FIGS. 1 and 2, one embodiment of a system 10 and method 200 for incentivized distribution of content 12 includes a first communications device 14 operable to exchange data over a network 16 with a second communications device 18. First communications device 14 has received content 12 and its associated usage rules 20 from content server 22. Usage rules 20, for example, include a license 24 to execute content 12 on a first communications device 14. As such, first communications device 14 has further received, or is otherwise associated with, license 24 from licensing server 26. A user of first communications device 14 may enjoy content 12, such as an audio file of a new song, and want to recommend it to a friend, and/or may desire a reward 28 for encouraging others to purchase content 12 and/or its associated license 24. As such, the user operates content manager module 30 to generate and transmit a referral message 32 to second communications device 18 (FIG. 2, Blocks 202 and 204). Referral message 32 includes: a destination 31, such as an Internet Protocol ("IP") address, mobile identification number ("MIN"), phone number, name, or any other identifier of the intended recipient of referral message 32; a user message 33, such as the first user's recommendation of content 12; and ordering information 35 for use in purchasing the content or its license, such as: a content link 36 indicating a source, such as a website, an internet protocol ("IP") address, etc., where the content/license may be obtained; a content identification 37 including information relating to the identity of the referred content, for example, a number and/or name associated with content 12 and/or information of an identity of license 24 for content 12; and a referral identification 38 including information relating to the identity of the referring party, such as a name and/or number associated with the referring user or associated with first communications device 14. Optionally, in one embodiment, referral message 32 additionally includes all or at least a portion 34 of content 12, including a teaser, a sample, or some other part of the content "in the clear," or available for a limited use, e.g. a one-time use, or in a format that may be executed without license 24.

After receiving referral message 32 (FIG. 2, Block 206), and optionally executing at least the free, limited use, or "in the clear" portion 34 of content 12, the user of second communications device 18 may desire to purchase the entire content 12 or license 24 based on referral message 32. As such, the user of second communications device 18 operates its resident content manager module 30 to generate and transmit an order message 40 to content server 22 and/or licensing server 26 (FIG. 2, Blocks 208 and 210). Order message 40 includes ordering information 35 received in referral message 32 that indicates the content and/or license desired to be purchased as well as the referring party, and also purchasing information 42 that indicates how to complete the transaction. For example, purchasing information 42 may include: a buyer identification 44 such as a name and/or number indicating the identity of the ordering party; payment information 46, such as an account number associated with funds to pay for the transaction; and delivery information 48, such as a device identification, Internet Protocol ("IP") address, phone number, mobile identification number ("MIN"), or any other information that identifies a destination, such as a location on network 16, where to send the purchased content/license.

A clearance/billing server 50 associated with content server 22 and/or licensing server 26 receives and processes order message 40, and initiates the transfer of content 12 and/or license 24 that is received by second communications device 18 (FIG. 2, Blocks 212, 214, 216, 218). For example, clearance/billing server 50 checks the supplied purchasing information 42 with a funding source 52, such as a banking or credit institution associated with payment information 46, to verify that that the given information is valid and/or that funds exist to complete the transaction (FIG. 2, Block 214). Additionally, if the transaction is approved, i.e. if payment information 42 is valid, clearance/billing server 50 determines reward 28 and associates or transmits it to first communications device 14 based on referral identification 34 (FIG. 2, Blocks 220 and 222). For example, reward 28 may be any one of a plurality of types of benefits based on a reward scheme 54, and, for example, may include a credit to a content referral system subscriber account 56 associated with first communications device 14. Any subsequent purchases of content 12 and/or license 24 based on a new or subsequent referral message linked to one or more referring communications devices (FIG. 2, Blocks 224 and 226) may likewise result in another reward 28 being determined and associated with or received by select ones or all of the referring communications devices in the chain of referral messages (FIG. 2, Blocks 228 and 230). Thus, by providing one or more types of reward 28 for referrals of content 12, the present system, apparatus and methods advantageously provide a viral marketing mechanism for incentivized superdistribution, i.e. distribution between users, of content 12.

Content 12 may be any type of information or data transferable between communication devices 14 and 18 across network 16. In one embodiment, content 12 includes digital media subject to a digital rights management ("DRM") system that limits the execution of the respective digital media to authorized parties, such as those parties and/or devices having a valid license 24. In this case, for example, content 12 may include audio files, video files, software applications/ programs, graphics, access to live, streaming data, etc.

First and second communications devices 14 and 18 can include any type of computerized, wired or wireless devices. For example, wired communications devices include desktop computers, while wireless devices include a cellular telephone, a personal digital assistant, a two-way text pager, a portable computer, and any computer platform that has a wireless communications portal and which also may have a wired connection to a network or the Internet. First and second communications devices 14 and 18 can be a remote-slave, or other device that does not have an end-user thereof but simply communicates data across wireless network 16, such as a remote sensor, a diagnostic tool, a data relay, and the like. The apparatus and method of incentivized distribution of content 12 on communications devices can accordingly be performed on any form of device or computer module, including a wired or wireless communication portal, a wireless modem, a Personal Computer Memory Card International Association ("PCMCIA") card, an access terminal, a personal computer, a wired or wireless telephone, or any combination or sub-combination thereof.

Network 16 includes any communications network operable, at least in part, for enabling communications between respective communications devices, such as devices 14 and 18, and/or with any other device connected to network 16. For example, network 16 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network ("PSTN"); a public heterogeneous communications network, such as the Internet; a private communications network; and a land mobile radio network. Additional examples of telephone networks include at least one, or any combination, of analog and digital networks/technologies, such as: Personal Communications Services, code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), analog and digital satellite systems, and any other technologies/protocols that may be used in at least one of a wireless communications network and a data communications network.

Further, network 16 may include all network components, and all connected devices that form the network. For example, in an embodiment comprising a cellular telephone system, network 16 may include a local area network ("LAN") that connects and enables communication exchanges with servers 22, 26 and 50. Additionally, the cellular telephone system embodiment includes a carrier network that controls messages (generally being data packets) sent to a mobile switching center ("MSC") Further, the carrier network communicates with the MSC through another network, such as the Internet, and/or POTS ("plain old telephone service"). Typically, this network has a first portion, such as the Internet, that transfers data and a second portion, such as the POTS, that transfers voice information. Additionally, the MSC may be connected to multiple base stations ("BTS") by yet another network, such as a data network and/or an Internet portion for data transfer and a POTS portion for voice information. The BTS ultimately broadcasts messages wirelessly to one or more wireless devices via an over-the-air method, such as short messaging service ("SMS").

Figure 3:
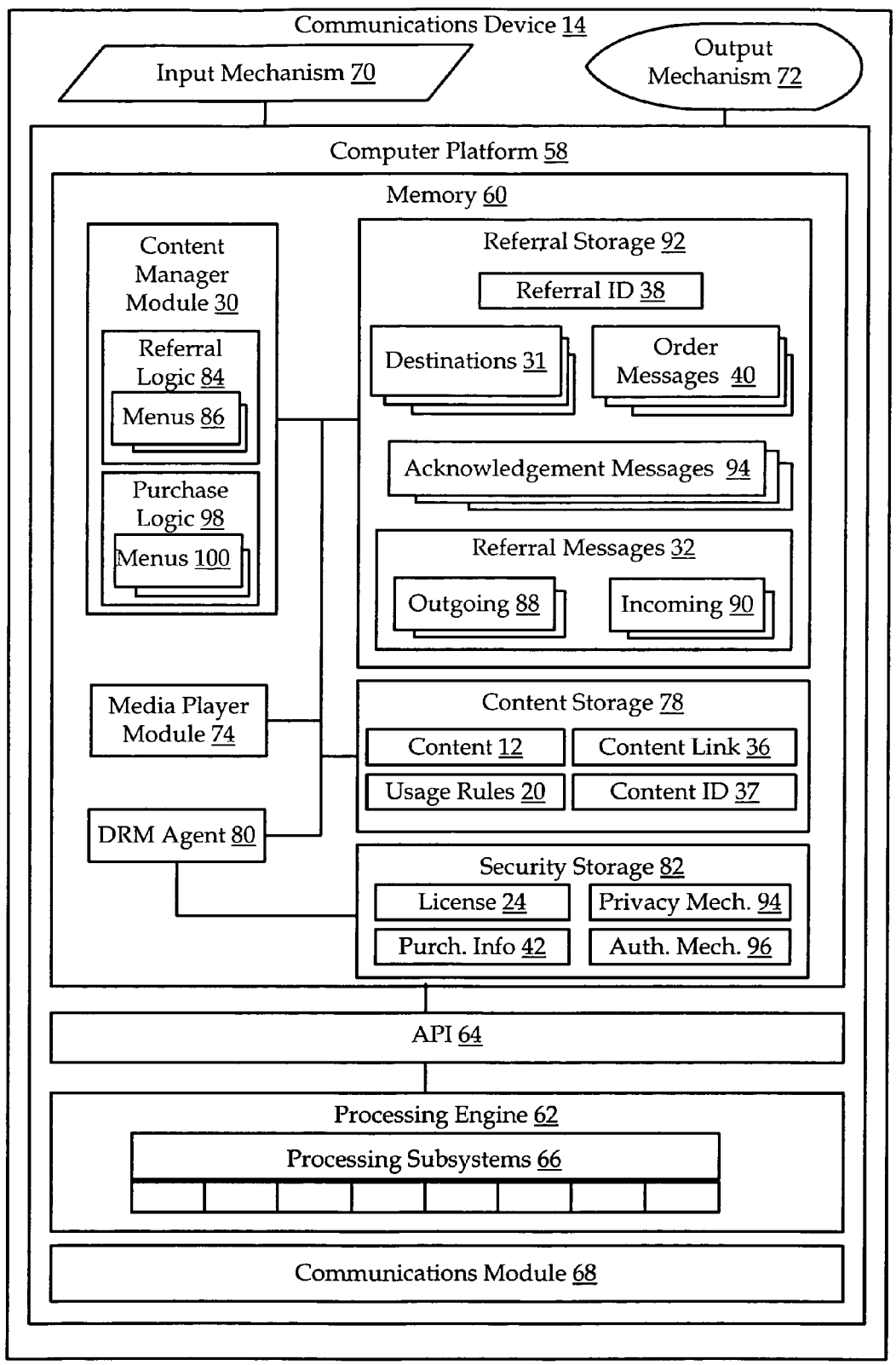
FIG. 3 is a schematic architectural diagram of one embodiment of a communications device of FIG. 1.

Referring to FIGS. 1 and 3, in one embodiment, each communications device 14 and 18 comprises a "smart" cellular telephone having a computer platform 58 comprising a memory 60 for storing data and executable instructions, a processing engine 62 for executing instructions and processing data, and an application program interface ("API") 64 that provides interaction with the processing engine 62.

Memory 60 may include read-only and/or random-access memory (RAM and ROM), EPROM, EEPROM, flash cards, or any memory common to computer platforms. Additionally, memory 60 includes any local, remote or removable storage mechanism that can hold software applications, files, or data not being actively used. Such storage mechanisms typically includes one or more flash memory cells, but can be any secondary or tertiary storage device, such as magnetic media, EPROM, EEPROM, optical media, tape, or soft or hard disk.

Processing engine 62 may be an application-specific integrated circuit ("ASIC"), or other chipset, processor, logic circuit, or other data processing device. Processing engine 62 includes various processing subsystems 66 embodied in hardware, firmware, software, and combinations thereof, that enable the functionality of the respective device 14 or 18, and the operability of the respective device on network 16, such as for connecting with the network, exchanging data/communications with other devices, etc. In one embodiment, for example in a wireless telephone, processing engine 62 may include one or a combination of processing subsystems 66, such as: sound, non-volatile memory, file system, transmit, receive, searcher, physical layer, link layer, call processing layer, main control, remote procedure, music, audio, handset, power management, diagnostic, digital signal processor, vocoder, messaging, call manager, Bluetooth® LOPS, position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications.

API 64 is a runtime environment executing on the respective communications device. One such runtime environment is Binary, Runtime Environment for Wireless® (BREW®) software developed by Qualcomm, Inc., of San Diego, Calif. Other runtime environments may be utilized that, for example, operate to control the execution of applications on computing devices. API 64 allows software developers to create software applications that operate on the respective device, and that control certain functionality on the device.

In one embodiment, API 64 includes a class of software extensions that allow content manager module 30 to access processing engine 62. These software extensions can communicate with processing subsystems 66 on the device, which allows both data reads and commands. For example, this software extension can send commands on behalf of the applications that invoke it. The module can then forward the responses of the subsystems to the application that invoked it. Each resident application on the respective device can create an instance of this new software extension to communicate with the subsystems independently.

Additionally, computer platform 58 may further include a communications module 68 embodied in hardware, firmware, software, and combinations thereof, that enables communications among the various components of the respective communications device 14 or 18, as well as between the device and network 16.

Further, each respective communications device 14 or 18 may also include additional components, such as an input mechanism 70 for receiving user inputs and an output mechanism 72 for transmitting information to the user of the device. For example, input mechanism 70 may include, but is not limited to, one or more of an alphabetic and/or numeric keypad, a navigational key, a predetermined function key, a mouse, a touch sensitive display, and voice recognition software. For example, output mechanism 72 may include, but is not limited to, one or more of a display, an audio speaker, a haptic interface such as a vibrating member, and a light emitting mechanism.

Referring to FIG. 3, in one embodiment, memory 60 of each computer platform 58 may further include a content manager module 30 executable by processing engine 62 to perform the functions and operations of incentivized distribution on each device as described herein. Content manager module 30 may be embodied in at least one of hardware, software, firmware, data and executable instructions. Content manager module 30 interacts with a media player module 74 to organize and execute content 12 stored in content storage 78. Media player module 74 may be embodied in at least one of hardware, software, firmware, data and executable instructions, and generally controls interaction with any stored and/or received content 12. Additionally, a digital rights management ("DRM") agent 80 interacts with both content manager module 30 and media player module 74 to verify the existence of proper rights, such as license 24 in security storage 82, prior to executing restricted or limited use content. DRM agent 80 may be embodied in at least one of hardware, software, firmware, data and executable instructions, and generally controls the consumption of any content 12 based on the associated usage rules 20.

Further, content manager module 30 includes referral logic 84 to handle the operations associated with transmitting and/or receiving communications related to referral message 32. For example, referral logic 84 may include predetermined referral menus 86 presentable to a user of the respective device via output mechanism 72. Such referral menus 86 may guide the user through the process of generating and transmitting outgoing/sent referral messages 88, as well as receiving and reviewing incoming/received referral messages 90. For example, using referral logic 84, content manager module 30 may receive user inputs from input mechanism 70 instructing the module to assemble the various portions of referral message 32. Such user inputs may include, for example, user message 33 (FIG. 1), a selection of which content 12 and/or content link 36 to send, and a selection of one or more destinations 31 to where referral message 32 should be sent. For example, content storage 78 may include a table or relational database linking each piece of content 12 with one or more content identifications 37 and/or one or more content sources 36. Similarly, a referral storage 92 may store a list of destinations 31. Referral logic 84 may further execute to automatically attach content identification 37 corresponding to the selected content 12 and/or the selected content link 36, and also automatically attach referral identification 38. Additionally, in some embodiments, referral logic 84 may execute to apply a privacy mechanism 93 to all or a portion of referral message 32. For example, in one embodiment, privacy mechanism 93 is applied to referral identification 38 to protect hide it from view and protect it from being altered. Privacy mechanism 93, may include, but is not limited to, one or more of a hash function, an encryption algorithm, and a message authentication code (MAC). In one embodiment, for example, privacy mechanism 93 is shared with clearance/billing server 50 to enable the referring user/device to be properly credited with reward 28 when an order message 40 is received based on referral message 32 sent by that user/device.

Further, referral logic 84 and predetermined referral menus 86 may guide the user through the process of receiving referral message 32, i.e. an incoming referral message 90, from across network 16. Referral logic 84 may execute to store the associated portions of referral message 32, and, optionally, to initiate operation of media player module 74 and DRM agent 80 in order to present content 12 or content portion 34 to the user. Additionally, in some embodiments, upon receiving referral message 32, referral logic 84 may execute to generate and initiate the transmission of an acknowledgement message 94 back to the referring device across network 16, i.e. if first communications device 14 sends referral message 32 to second communications device 18, then second communications device 18 sends acknowledgement message 94 to first communications device 14 to confirm its receipt. In some embodiments, referral logic 84 further executes to apply an authentication mechanism 96 to all or at least a portion of acknowledgement message 94. Authentication mechanism 96 validates the identity of the authenticating party, i.e. second communications device 18 in the above example, and also may be used as proof to validate the transaction, i.e. the receipt of referral message 32. For example, authentication mechanism 96 may be verifiable by clearance/billing server 50, which may utilize a copy of acknowledgement message 94 with authentication mechanism 96 to ensure that reward 28 is based on a valid referral transaction. Authentication mechanism 96 includes, but is not limited to, a digital signature, an encryption algorithm, and a MAC.

Additionally, content manager module 30 may include purchase logic 98 to handle the operations associated with transmitting and/or communications related to order message 40. For example, purchase logic 98 may include predetermined purchase menus 100 presentable to a user of the respective device via output mechanism 72. Such purchase menus 100 may guide the user through the process of generating and transmitting outgoing order messages 40, as well as receiving and reviewing any other order-related communications. For example, using purchase logic 98, content manager module 30 may receive user inputs from input mechanism 70 instructing the module to assemble the various portions of order message 40. Such user inputs may include, for example, a selection of which ordering information 32, i.e. which content 12 to purchase, and which payment information 42 to utilize. For example, the desired content 12 to order may be selected from one of predetermined purchasing menus 100 based on a list derived from one or more received referral messages 90 stored in referral storage 92, or from a list of content 12, etc. derived from content storage 78. In some embodiments, purchase logic 98 further executes to apply authentication mechanism 96, as discussed above, to all or at least a portion of order message 40. Authentication mechanism 96 validates the identity of the authenticating party, i.e. second communications device 18 in the above example. For example, authentication mechanism 96 may be verifiable by clearance/billing server 50 to ensure that order message 40 is a valid request.

Figure 4:
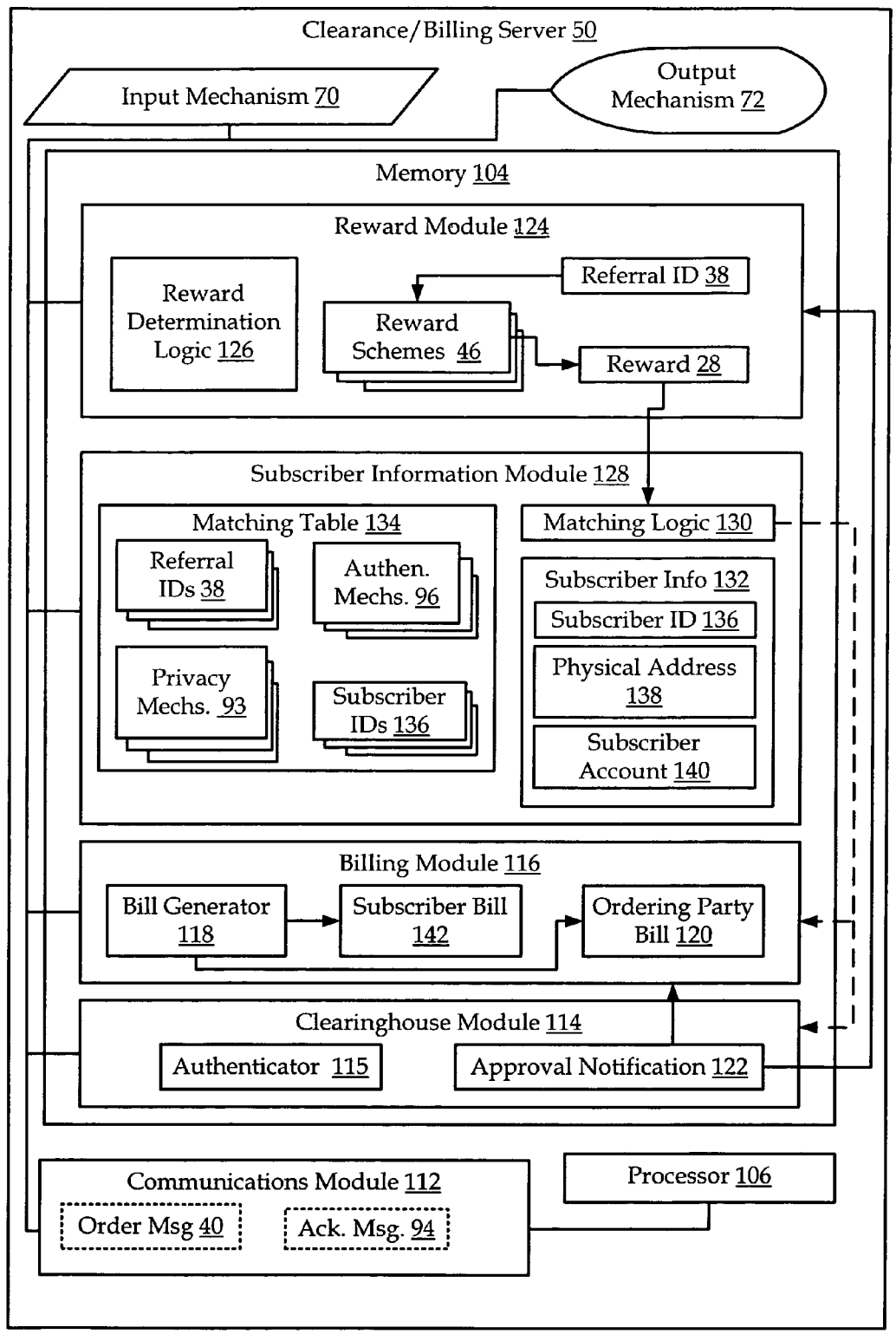
FIG. 4 is a schematic architectural diagram of one embodiment of a clearance/billing server of FIG. 1.

Referring to FIGS. 1 and 4, in one embodiment, clearance/billing server 50 operates on a network 102, such as a local area network ("LAN"), in conjunction with licensing server 26 and content server 22. Clearance/billing server 50 may be embodied in at least one of hardware, software, firmware, data and executable instructions, and may be any type of computerized device. Clearance/billing server 50, and also content server 22 and licensing server 26, may include: a memory 104 for storing data and applications; a processor 106 for executing instructions; an input mechanism 108 such as a keyboard and/or mouse for receiving user inputs; an output mechanism 110 such as a display and/or a speaker for presenting output information to the user; and a communications module 112 for managing communications and data exchange within the various components of server 50 and with networks 102 and 16. For example, in one embodiment, the user of server 50 may be a customer service representative, a technician, an operator, or some other person capable of monitoring, assisting and/or correcting the purchasing and reward transactions associated with the described embodiments.

Generally, clearance/billing server 50 operates to manage and control the purchasing transaction and the associated reward transaction. In one embodiment, clearance/billing server 50 includes a clearinghouse module 114 that parses purchasing information 42 from order message 40 to verify that valid information is supplied to purchase the ordered content 12 and/or license 24. For example, clearinghouse module 114 may exchange communications with funding source 52, such as a banking institution, credit institution, and/or some other available funding network in order to validate purchasing information 42. Thus, clearinghouse module 114 operates to approve the content/license ordering transaction. Additionally, clearinghouse module 114 may include an authenticator 115 operable to review and verify any authentication mechanisms 96 that may be utilized in messages received by clearance/billing server 50, including order messages 40 and acknowledgement messages 94.

Further, clearance/billing server 50 may include a billing module 116 operable to execute bill generator 118, which generates an ordering party bill 120 upon receiving an approval notification 122 representing an approved ordering transaction from clearinghouse module 114. Billing module 116 is operable to send ordering party bill 120 either to the source of order message 40, such as communications device 18, or to funding source 52, such as a bank, based on purchasing information 42.

Additionally, clearance/billing server 50 includes reward module 124 having reward determination logic 126 operable to execute at least one of a plurality of reward schemes 54 to generate reward 28 based on receiving approval notification 122 associated with order message 40. Reward schemes 54 may be any method of determining reward 28. For example, reward schemes 54 may include any one of: providing a fixed reward for each referral-based order; providing a graduated reward depending on how many referrals are referenced in the order, e.g. in the case where there are one or more intervening referrals, based on an initial referral message, referenced by the order message, for example an initial referral message is forwarded to a second party, and then the second party forwards the referral onto a third party, and so on, the initially-listed referral identification may get a greater reward than the second-listed referral identification, which may get a greater reward than the third-listed referral identification, and so on; having different levels of rewards, where the reward in each level has a different value, for example, where higher levels have increased value rewards, where each ascending level is associated with an increasing range of number of referral messages sent and/or order messages received based on referral messages associated with a given referral identification, or based upon an amount of a membership fee paid; etc. It should be understood that the above-stated list of reward schemes 54 is only for purposes of understanding the described embodiments, and that many other reward schemes having many other parameters may be implemented. As such, depending on which reward scheme 54 is utilized, reward module 124 may be supplied with or may parse referral identification 38 from order message 40 in order to determine reward 28. Further, in some embodiments, reward determination logic 126 may be further operable to match acknowledgement message 94 with order message 40, or to receive verification of a match, in order to verify the existence of a valid referral transaction prior to the determination of reward 28.

Reward 28 may be anything of value to the user, i.e. a party generating referral message 32, of system 10. For example, reward 28 may be a credit to an account, a discount on a future purchase, a free download of content, free or discounted products or services available within or outside of network 16, and any other thing having potential value to the user.

Clearance/billing server 50 may further include a content referral system subscriber information module 128 that includes matching logic 130 operable to associate reward 28 received from reward module 124 with content referral system subscriber information 132 based on referral identification 38 associated with reward 28. For example, content referral system subscriber information module 128 includes a matching table 134 that links each of a plurality of referral identifications 38 with a corresponding one of a plurality of subscriber identifications 136. Subscriber identification 136, which for example may be a unique subscriber name or subscriber number, is associated with additional subscriber information 132, such as a physical address 138, such as an address of the residence of the subscriber, and a content system subscriber account 140. Subscriber account 140, which may be a unique numeric and/or alphabetic identifier associated with subscriber identification 136, may keep track of received rewards 28, number of referral messages sent, number of orders received based on those referrals, values associated with the current level of eligible rewards, number of purchased made by the subscriber, and any other information that the user of the system, or the authority running the system, may find useful. Additionally, based on the matching performed by subscriber information module 128, reward module 124 may associate reward 28 to the matched subscriber account 140 or may transmit reward 28 to a communications device associated with the subscriber information 132 and/or referral identification 38.

Further, matching table 134 may further associate privacy mechanisms 93 with a given subscriber identification 136, as well as authentication mechanisms 96, referral messages 32, acknowledgement messages 94 and order messages 40.

Additionally, billing module 116 may generate and transmit a subscriber bill 142 based on subscriber information 132 and/or reward 28. For example, in an embodiment where content server 22, licensing server 26 and clearance/billing server 50 comprise a music download site, billing module 116 generates subscriber bill 142 that may include a balance/payment due based on purchases by the subscriber minus any rewards received.

Figure 5:
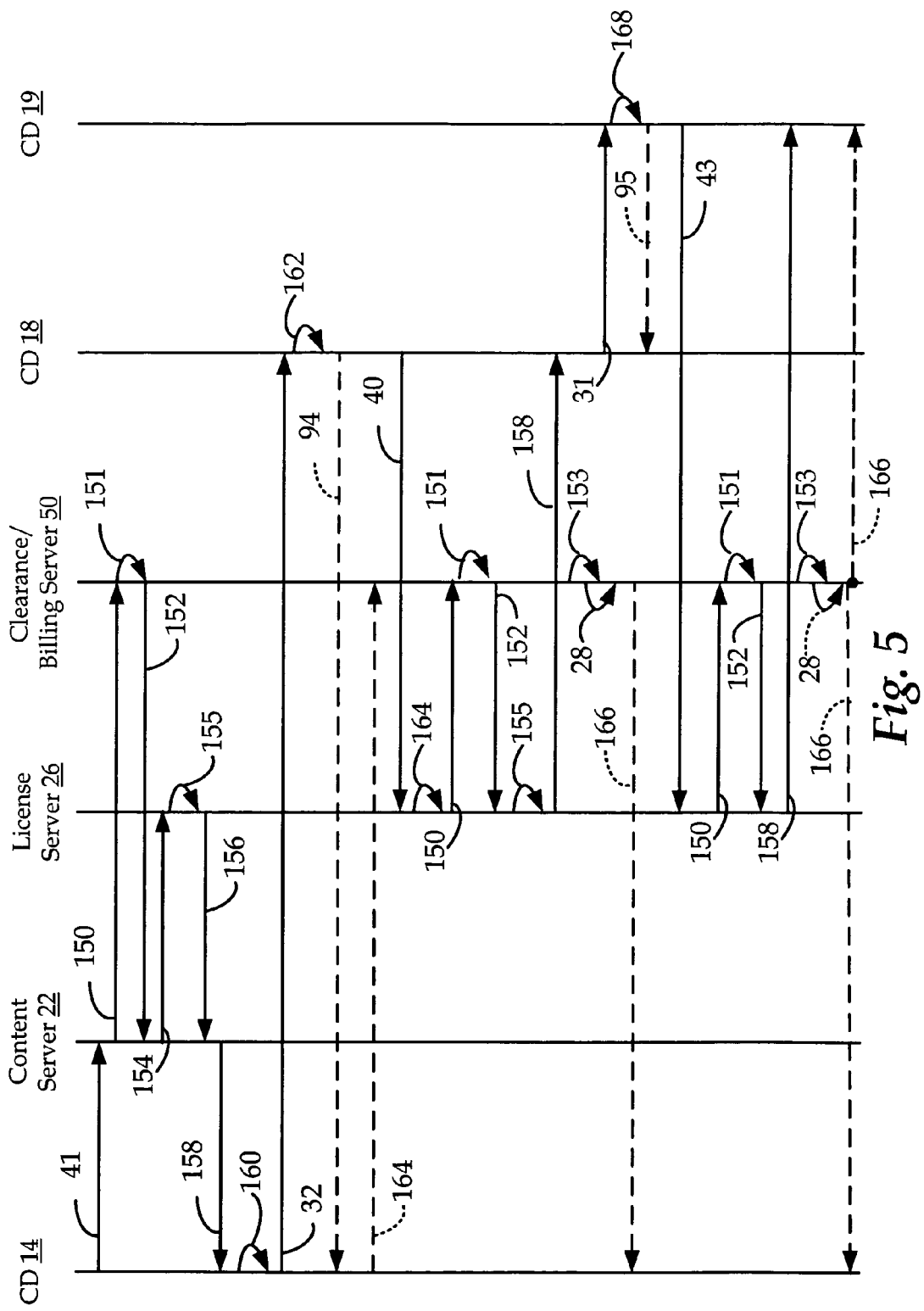
FIG. 5 is a message flow diagram associated with one embodiment of an operation of the system of FIG. 1.

Referring to FIG. 5, one embodiment of a series of message exchanges associated with performing a method of superdistribution of content includes first communications device 14 sending an order message 41 to content server 22 requesting a download of content 12, such as an audio or video file. Order message 41 may be substantially similar to order message 40, however, in a case where first communications device 14 is not purchasing content 12 based on a referral, order message 41 does not contain any referral message 32 information. For example, in one embodiment, order message 41 may include an authentication mechanism 96, such as a digital signature associated with first communications device 14. Content server 22 sends a funding verification request message 150, which includes at least purchasing information 42 from order message 41, to clearance/billing server 50. Clearance/billing server 50 operates to verify the availability of funding (operation 151), and optionally an authenticity of the requester, and returns a funding verification result message 152 back to content server 22. Message 152 indicates an approved or a declined status of funding. If the funding is approved, then content server 22 sends a license request message 154 to license server 26, which operates to find license 24 (operation 155) and returns a license message 156 including license 24 to content 12. Then, content server 22 sends a content delivery message 158, including, for example, content 12, usage rules 20 and license 24, to first communications device 14.

Alternatively, in some cases, license server 26 may deliver license 24 through a separate channel independent of content server 22 based on, for example, a pull or push model. For instance, content server 22 and/or billing/clearance server 50 may provide a notification or pre-approval message to license server 26, pre-approving the delivery of license 24 and/or content 12 to a predetermined communications device. As such, when contacted by the preapproved communications device, license server 26 knows that it is acceptable to deliver license 24 and/or content 12. Alternatively, in a push model, license server 26 may push license 24 and/or content 12 to the predetermined communications device, such as via short message service (SMS) or wireless access protocol (WAP).

First communications device 14 may receive and execute content 12, such as through content manager module 30 (operation 160). Further, first communications device 14 may generate and transmit referral message 32 to recommend content 12 to another device, such as second communications device 18. For example, in one embodiment, referral message 32 includes a hashed value of the referral identification of the first communications device (hash($ID_{14}$)) to protect the privacy of the identification. Second communications device 18 may receive referral message 32 and may either go to content link 36 to sample content 12 or optionally execute all or a portion of some enclosed content 12, such as through content manager module 30 (operation 162). Optionally, through its resident content manager module 30, second communications device 18 may send acknowledgement message 94 back to first communications device 14 and/or clearance/billing server 50 to verify receipt of the referral message. Alternatively, first communications device 14 may send a forwarding acknowledgement message 164, including all or a portion of acknowledgement message 94, for logging at clearance/billing server 50. In one embodiment, acknowledgement message 94 includes a digital signature associated with second communication device 18 applied to the hashed referral identification of first communications device ($S_{18}$(hash($ID_{14}$))).

Further, through its resident content manager module 30 and based on referral message 32 received from first communications device 14, second communications device 18 may operate to generate and transmit (operation 162) order message 40 to license server 26 to request a download of license 24 for content 12. For example, in one embodiment, order message 40 includes authentication mechanism 96, such as a digital signature, of second communications device 18 applied to the hashed referral identification of first communications device ($S_{18}$(hash($ID_{14}$))). License server 26 sends funding verification request message 150 to clearance/billing server 50. Clearance/billing server 50 operates to verify the availability of funding (operation 151) and returns funding verification result message 152, which indicates an approval or a decline status of funding, back to license server 26. If the funding is approved, then license server 26 operates to find license 24 (operation 155) and forward license 24 to second communications device 18 in content delivery message 158. Additionally, because the purchase of license 24 to content 12 was based on referral message 32, clearance/billing server 50 operates (operation 153) to generate reward 28 and associate the reward with the referral identification in the order message, which in this case is associated with first communications device 14. As such, clearance/billing server 50 may attach reward 28 to the corresponding subscriber account, i.e. the account of first communication device, or may send a reward message 166, which may include reward 28 or a notification of the reward, directly to first communications device 14. Additionally, clearance/billing server 50 logs the purchase/order transaction for accounting purposes with respect to both devices 14 and 18.

Further, second communications device 18 may generate and transmit another referral message 31 to recommend content 12 to another device, such as third communications device 19. Referral message 31 may be substantially the same as referral message 32, but may further include the referral identification of second communications device 18 appended to or nested with the referral identification of first communications device 14. In this manner, a series of subsequent referrals based on an initial referral can be tracked and accounted for. Additionally, referral message 31 may include other changes, such as a new user message 33. For example, in one embodiment, referral message 31 includes a hashed value of the referral identification of the second communications device 18 nested with the digital signature of second communications device applied to the hashed referral identification of the first communications device (hash($ID_{18}$)+$S_{18}$(hash($ID_{14}$)). Third communications device 19 may receive and either access content link 36 to review content 12 or optionally execute any enclosed content 12, such as through content manager module 30 (operation 168). Optionally, through its resident content manager module, third communications device 19 may send acknowledgement message 95 back to second communications device 18 and/or first communications device 14 and/or clearance/billing server 50 to verify receipt of referral message 31. In one embodiment, acknowledgement message 95 is similar to acknowledgement message 94, but includes the nested values from referral message 31. For example, in one embodiment, acknowledgement message 95 includes digital signature associated with third communication device 19 applied to the hashed referral identification of second communications device 18, which is appended to the digital signature of the second communications device applied to the hashed referral identification of the first communications device ($S_{19}$(hash($ID_{18}$))+$S_{18}$(hash($ID_{14}$))).

Additionally, through its resident content manager module and based on referral message 31 received from second communications device 18, third communications device 19 may operate to generate and transmit (operation 168) order message 43 to license server 26 to request a download of license 24 for content 12. For example, in one embodiment, order message 43 includes authentication mechanism 96, such as a digital signature, of third communications device 19 applied to the combination of the hashed referral identification of the second communications device and the digital signature of the second device applied to the hash of the referral identification of the first device ($S_{19}$(hash($ID_{18}$))+$S_{18}$(hash($ID_{14}$))). License server 26 sends funding verification request message 150 to clearance/billing server 50. Clearance/billing server 50 operates to verify the availability of funding (operation 151) and returns funding verification result message 152, which indicates an approval or a decline status of funding, back to license server 26. If the funding is approved, then license server 26 operates to find license 24 (operation 155) and forward license 24 to third communications device 19 in content delivery message 158. Additionally, because the purchase of license 24 to content 12 was based on referral message 31, clearance/billing server 50 operates (operation 153) to generate reward 28 and associate the reward with the referral identification in the order message, which in this case is associated with both second communications device 18 and first communications device 14. In this case, the reward given to each referring device may vary depending on the reward scheme. In any case, clearance/billing server 50 may attach reward 28 to the corresponding subscriber account, i.e. the accounts of both first and second communication devices, or may send each device a reward message 166, which may include reward 28 or a notification of the reward. Additionally, clearance/billing server 50 logs the purchase/order transaction for accounting purposes with respect to both devices 14 and 18.

Such a message flow may continue in a similar manner, with any number of intervening referral messages between the initial referral message and the order message based on a received referral message. For example, in one embodiment, the referral messages contain referral information in a pyramidal architecture such that subsequent referral messages reference the preceding referral messages in the sequence. Such a referencing structure allows the system to account for each referring party in the chain of referrals. Alternatively, other schemes may be utilized where, for example, the number of preceding referrals is limited.

It should be noted that the above-discussed message sequence is but one example out of a plurality of viable message sequences. Other sequences may be utilized, for example, where messages are omitted, added, or have different destinations, such as in an embodiment where the content, licensing and clearance/billing servers are integrated into a single unit.

While the various disclosed embodiments have been illustrated and described, it will be clear that the subject matter of this document is not limited to these embodiments only. For example, although content manager module 30, media player module 74 and DRM agent 80 have been described as independent mechanisms, they may be combined together or further separated in any fashion to perform the functions described above. Further, content manager module 30, media player module 74 and DRM agent 80 may be resident, permanently or temporarily, on any portion of computer platform 58, such as within API 64 or in processing engine 62. Further, referral storage 92, content storage 78 and security storage 82 may likewise be combined or further separated in any fashion. Additionally, content server 22, licensing server 26 and clearance/billing server 50 may be combined and or further separated in any fashion. Numerous other modifications, changes, variations, substitutions and equivalents will be apparent to those skilled in the art without departing from the spirit and scope of the disclosed embodiments as described in the claims.

What is claimed is:

1. A method of content distribution, comprising:
generating a first referral message including a first referral identification, a content identification and a content link, wherein the first referral identification comprises a unique first device identifier associated with a first communications device generating the first referral message, wherein the content identification comprises a unique content identifier associated with a digital content having a license, and wherein the content link comprises a reference to a source operable to transmit at least one of the digital content and the license to the digital content across a wireless network;

transmitting the first referral message from the first communications device to a second communications device;
receiving an acknowledgement message at the first communications device, wherein the acknowledgement message confirms a receipt of at least a portion of the first referral message;
transmitting the acknowledgement message from the first communications device to an apparatus associated with generating a reward; and
receiving a first reward based on the first referral message, wherein receiving the first reward is further based on the transmitting of the acknowledgement message.

2. The method of claim 1, where the first referral message further comprises at least a portion of the digital content.

3. The method of claim 1, where the source is operable to provide live streaming of the digital content.

4. The method of claim 1, further comprising applying a privacy protection mechanism to the first referral identification in the first referral message.

5. The method of claim 1, wherein the acknowledgement message further comprises an authentication mechanism applied to at least a portion of the first referral message, wherein the authentication mechanism validates that the acknowledgement message was sent from a predetermined communications device.

6. The method of claim 1, wherein receiving the first reward based on the first referral message is further based on an order message from the second communications device or a subsequent communications device that receives a subsequent referral message based on the first referral message, wherein the order message references at least a portion of the first referral message or the subsequent referral message and comprises a request to purchase the digital content or the license to the digital content.

7. The method of claim 1, further comprising receiving a second reward based on a subsequent referral message that references the first referral message.

8. The method of claim 7, wherein the second reward is different than the first reward.

9. The method of claim 8, wherein the difference between the first reward and the second reward is based on a number of intervening referral messages between the first referral message and the subsequent referral message.

10. The method of claim 6, wherein the order message comprises an authentication mechanism that validates that the order message was sent from the second communications device or the subsequent communications device and that the first referral message was transmitted by the first communications device.

11. The method of claim 1, wherein receiving the first reward based on the first referral message is further based on the first referral identification.

12. The method of claim 1, wherein transmitting the first referral message further comprises transmitting the first referral message over the wireless network, wherein the first communications device and the second communications device comprise wireless devices.

13. The method of claim 1, wherein receiving the first reward further comprises receiving a credit corresponding to the first reward in an account associated with the first referral identification.

14. The method of claim 1, wherein the first reward is further based on a match between an order message and the acknowledgement message, wherein the order message includes the first referral identification and the content identification.

15. The method of claim 5, wherein the authentication mechanism is applied to the first referral identification or a representation of the first referral identification.

16. A non-transitory computer-readable medium embodying logic for content distribution, comprising:
at least one sequence of instructions, wherein execution of the at least one sequence of instructions by a processor causes the processor to perform the acts of:
generating a first referral message including a first referral identification, a content identification and at least a portion of a content link, wherein the first referral identification comprises a unique first device identifier associated with a first communications device generating the first referral message, wherein the content identification comprises a unique content identifier associated with a digital content having a license, and wherein the content link comprises a reference to a source operable to transmit at least one of the digital content and the license to the digital content across a wireless network;
transmitting the first referral message from the first communications device to a second communications device;
receiving an acknowledgement message at the first communications device, wherein the acknowledgement message confirms a receipt of at least a portion of the first referral message;
transmitting the acknowledgement message from the first communications device to an apparatus associated with generating a reward; and
receiving a first reward based on the first referral message, wherein receiving the first reward is further based on the transmitting of the acknowledgement message.

17. The non-transitory computer readable medium of claim 16, wherein the first reward is further based on a match between an order message and the acknowledgement message, wherein the order message includes the first referral identification and the content identification.

18. The non-transitory computer readable medium of claim 16, wherein the acknowledgement message further comprises an authentication mechanism applied to at least a portion of the first referral message, wherein the authentication mechanism validates that the acknowledgement message was sent from a predetermined communications device.

19. The non-transitory computer readable medium of claim 18, wherein the authentication mechanism is applied to the first referral identification or a representation of the first referral identification.

20. A communications device, comprising:
means for generating a first referral message including a first referral identification, a content identification and at least a portion of a content link, wherein the first referral identification comprises a unique first device identifier associated with the communications device generating the first referral message, wherein the content identification comprises a unique content identifier associated with a digital content having a license, and wherein the content link comprises a reference to a source operable to transmit at least one of the digital content and the license to the digital content across a wireless network;
means for transmitting the first referral message from the communications device to a second communications device;

means for receiving an acknowledgement message at the communications device, wherein the acknowledgement message confirms a receipt of at least a portion of the first referral message;

means for transmitting the acknowledgement message from the communications device to an apparatus associated with generating a reward; and means for receiving a first reward based on the first referral message, wherein receiving the first reward is further based on the transmitting of the acknowledgement message.

21. The communications device of claim 20, wherein the first reward is further based on a match between an order message and the acknowledgement message, wherein the order message includes the first referral identification and the content identification.

22. The communications device of claim 20, wherein the acknowledgement message further comprises an authentication mechanism applied to at least a portion of the first referral message, wherein the authentication mechanism validates that the acknowledgement message was sent from a predetermined communications device.

23. The communications device of claim 22, wherein the authentication mechanism is applied to the first referral identification or a representation of the first referral identification.

24. A communications device, comprising:
a computer platform having a memory comprising a digital content having a license, a content link comprising a reference to a source operable to transmit at least one of the digital content and the license to the digital content across a wireless network, a unique content identifier associated with the digital content, and a first unique device identifier; and
a content manager module having referral logic operable to:
generate and transmit a first referral message, the first referral message comprising a first referral identification, the unique content identifier and the content link, wherein the first referral identification corresponds to the first unique device identifier;
receive an acknowledgement message from a second communications device, wherein the acknowledgement message confirms a receipt of at least a portion of the first referral message; and
transmit the acknowledgement message across the wireless network to an apparatus associated with generating a reward;
wherein the first referral message is operable to cause a first reward to be associated with the first referral identification when a purchase of the digital content or the license to the digital content is made based on the first referral message; and
wherein the first reward is further based on the transmitting of the acknowledgement message.

25. The communications device of claim 24, wherein the first referral message further comprises at least a portion of the digital content.

26. The communications device of claim 24, wherein the source is operable to provide live streaming of the digital content.

27. The communications device of claim 24, wherein the memory further comprises a privacy protection mechanism, and wherein the content manager module is operable to apply the privacy protection mechanism to the first referral identification in the first referral message.

28. The communications device of claim 24, wherein the acknowledgement message further comprises an authentication mechanism applied to at least a portion of the first referral message, wherein the authentication mechanism validates that the acknowledgement message was sent from the second communications device.

29. The communications device of claim 24, wherein the purchase is based on an order message generated by the second communications device, wherein the order message comprises a request to purchase the digital content or the license to the digital content, and wherein the order message references at least a portion of the first referral message.

30. The communications device of claim 29, wherein the order message further comprises an authentication mechanism that validates that the order message was sent from the second communications device and that the portion of the first referral message was received from the communications device.

31. The communications device of claim 24, wherein the reward is based on a subsequent referral message transmitted by a subsequent communications device, wherein the subsequent referral message is associated with the first referral message and comprises the first referral identification.

32. The communications device of claim 31, wherein the reward is selected from a plurality of potential rewards based on a number of intervening referral messages between the first referral message and the subsequent referral message.

33. The communications device of claim 24, wherein the communications device comprises a cellular telephone and wherein the wireless network comprises a cellular telephone network.

34. The communications device of claim 24, wherein the first reward is further based on a match between an order message and the acknowledgement message, wherein the order message includes the first referral identification and the content identification.

35. The communications device of claim 28, wherein the authentication mechanism is applied to the first referral identification or a representation of the first referral identification.

36. A processor, comprising:
a first logic for generating a first referral message including a first referral identification, a content identification and at least a portion of a content link, wherein the first referral identification comprises a unique first device identifier associated with a first communications device generating the first referral message, wherein the content identification comprises a unique content identifier associated with a digital content having a license, and wherein the content link comprises a reference to a source operable to transmit at least one of the digital content and the license to the digital content across a wireless network;
a hardware component for transmitting the first referral message from the first communications device to a second communications device;
a second logic for receiving an acknowledgement message at the first communications device, wherein the acknowledgement message confirms a receipt of at least a portion of the first referral message;
a third logic for transmitting the acknowledgement message from the first communications device to an apparatus associated with generating a reward; and
a fourth logic for receiving a first reward based on the first referral message, wherein receiving the first reward is further based on the transmitting of the acknowledgement message.

37. The processor of claim 36, wherein the first reward is further based on a match between an order message and the acknowledgement message, wherein the order message includes the first referral identification and the content identification.

38. The processor of claim 36, wherein the acknowledgement message further comprises an authentication mechanism applied to at least a portion of the first referral message, wherein the authentication mechanism validates that the acknowledgement message was sent from a predetermined communications device.

39. The processor of claim 38, wherein the authentication mechanism is applied to the first referral identification or a representation of the first referral identification.

* * * * *